(12) United States Patent
Lee (10) Patent No.: US 9,395,518 B2
(45) Date of Patent: Jul. 19, 2016

(54) IMAGING LENS

(75) Inventor: Sang Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 673 days.

(21) Appl. No.: 13/474,264

(22) Filed: May 17, 2012

(65) Prior Publication Data

US 2013/0003169 A1 Jan. 3, 2013

(30) Foreign Application Priority Data

Jun. 30, 2011 (KR) .................. 10-2011-0064826

(51) Int. Cl.
*G02B 13/00* (2006.01)

(52) U.S. Cl.
CPC .................. *G02B 13/004* (2013.01)

(58) Field of Classification Search
CPC ........ G02B 9/36; G02B 13/14; G02B 13/008; G02B 13/16; G02B 13/00–13/08
USPC .......... 359/357, 759, 762, 768–769, 350–361
See application file for complete search history.

(56) References Cited

U.S. PATENT DOCUMENTS

| | | | | |
|---|---|---|---|---|
| 4,904,070 | A * | 2/1990 | Hirakawa | 359/747 |
| 5,402,268 | A * | 3/1995 | Tatsuno | 359/747 |
| 6,091,551 | A * | 7/2000 | Watanabe | G02B 13/14 359/354 |
| 7,474,479 | B2 * | 1/2009 | Isono | 359/779 |
| 2002/0167738 | A1 | 11/2002 | Mori | |
| 2005/0141103 | A1 * | 6/2005 | Nishina | G02B 9/36 359/715 |
| 2005/0168807 | A1 * | 8/2005 | Endo | G02B 15/173 359/354 |
| 2006/0056066 | A1 | 3/2006 | Fujisaki et al. | |
| 2006/0114577 | A1 * | 6/2006 | Nishina | G02B 9/36 359/771 |
| 2008/0074760 | A1 | 3/2008 | Sato | |
| 2008/0252996 | A1 * | 10/2008 | Kato | 359/747 |
| 2010/0020417 | A1 | 1/2010 | Lin | |
| 2010/0110562 | A1 * | 5/2010 | Aoi | 359/715 |
| 2010/0149659 | A1 | 6/2010 | Chen et al. | |
| 2010/0208359 | A1 | 8/2010 | Chen et al. | |
| 2011/0216398 | A1 * | 9/2011 | Ando | G02B 9/34 359/357 |

FOREIGN PATENT DOCUMENTS

| | | |
|---|---|---|
| JP | 61-188511 A | 8/1986 |
| JP | 02-220016 A | 9/1990 |
| JP | 2002-287022 A | 10/2002 |
| JP | 2004-070093 A | 3/2004 |

(Continued)

OTHER PUBLICATIONS

Office Action dated Feb. 20, 2014 in Taiwanese Application No. 101109976.

(Continued)

*Primary Examiner* — Bumsuk Won
*Assistant Examiner* — Jeffrey Madonna
(74) *Attorney, Agent, or Firm* — Saliwanchik, Lloyd & Eisenschenk (57) ABSTRACT

Provided is an imaging lens. The imaging lens includes a first lens having a positive (+) power, a second lens having a positive (+) power, a third lens having a negative (−) power, and a fourth lens having a positive (+) power. The first lens, the second lens, the third lens, and the fourth lens are sequentially disposed from an object to transmit an image of light having a wavelength band of about 400 nm to about 1,000 nm. Thus, powers, distances, and Abbe's numbers of the first to fourth lenses may be controlled to photograph an image of visible light and infrared light.

11 Claims, 5 Drawing Sheets

(56) References Cited

FOREIGN PATENT DOCUMENTS

| | | |
|---|---|---|
| JP | 2006-064829 A | 3/2006 |
| JP | 2008-076953 A | 4/2008 |
| JP | 2008-090259 A | 4/2008 |
| JP | 2009-008956 A | 1/2009 |
| TW | 2010-05346 A | 2/2010 |
| TW | 2010-24789 A | 7/2010 |
| TW | 2010-31944 A | 9/2010 |

OTHER PUBLICATIONS

Office Action dated Aug. 27, 2013 in Japanese Application No. 2012-119561, filed May 25, 2012.

* cited by examiner

IMAGING LENS

CROSS-REFERENCE TO RELATED APPLICATION

This application claims the benefit under 35 U.S.C. 119 of Korean Patent Application No. 10-2011-0064826, filed Jun. 30, 2011, which is hereby incorporated by reference in its entirety.

BACKGROUND

Embodiments relate to an imaging lens.

In recent, studies with respect to camera modules for communication terminal, digital still cameras (DSCs), camcorders, PC cameras (i.e., an imaging device attached to a personal computer), etc., in relation to image pickup systems are being carried out. Here, an imaging lens for imaging images is the greatest important component for obtaining images in such a camera module related to the imaging pickup systems.

BRIEF SUMMARY

Embodiments provide an imaging lens having superior aberration properties and a small-sized camera module.

In one embodiment, an imaging lens includes: a first lens having a positive (+) power; a second lens having a positive (+) power; a third lens having a negative (−) power; and a fourth lens having a positive (+) power, wherein the first lens, the second lens, the third lens, and the fourth lens are sequentially disposed from an object to transmit an image of light having a wavelength band of about 400 nm to about 1,000 nm.

The details of one or more embodiments are set forth in the accompanying drawings and the description below. Other features will be apparent from the description and drawings, and from the claims.

DETAILED DESCRIPTION

In the description of embodiments, it will be understood that when each lens, unit, part, hole, projection, groove, or layer is referred to as being 'on' or 'under' another lens, unit, part, hole, projection, groove, or layer, the terminology of 'on' and 'under' includes both the meanings of 'directly' and 'indirectly'. Further, the reference about 'on' and 'under' each component layer will be made on the basis of drawings. In addition, the sizes of elements and the relative sizes between elements may be exaggerated for further understanding of the present disclosure.

FIGS. 1 to 4 are schematic side-sectional views illustrating an inner surface of an imaging lens according to embodiments.

Figure 1:
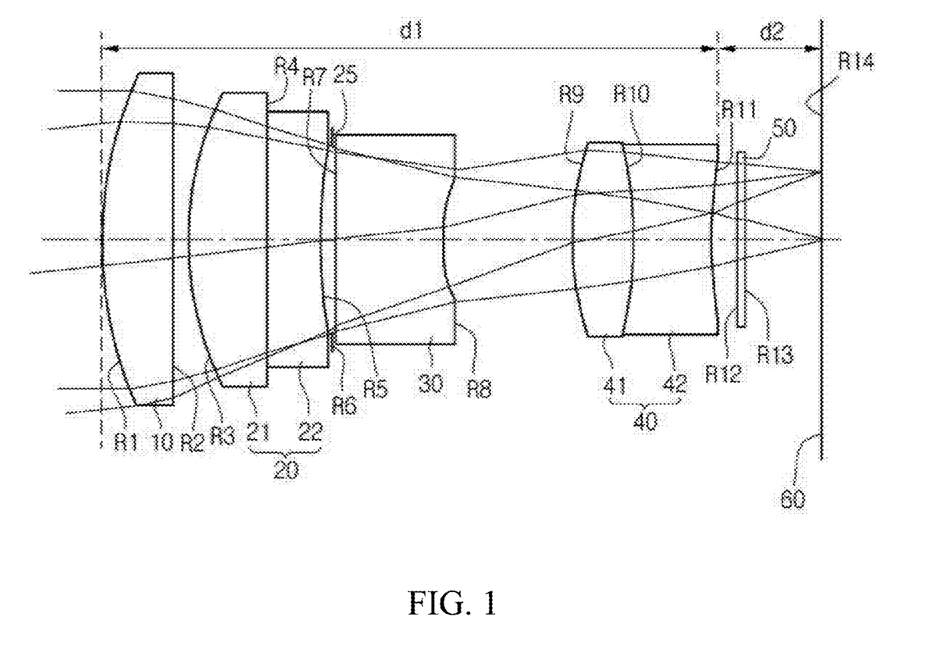
FIG. 1 is a schematic side-sectional view illustrating an inner surface of an imaging lens according to a first embodiment.

Referring to FIG. 1, an imaging lens according to a first embodiment includes a first lens 10, a second lens 20, an iris 25, a third lens 30, a fourth lens 40, a filter 50, and a light receiving device 60 which are sequentially disposed from an object toward a top surface R14.

To obtain an image of a subject, light corresponding to image information of the subject is incident into the light receiving device 60 through the first lens 10, the second lens 20, the iris 25, the third lens 30, the fourth lens, and the filter 50.

The first lens 10 has a positive (+) power. Also, the first lens 10 has a surface R1 convex toward the object.

The second lens 20 may be a doublet lens. The second lens 20 includes a first sub lens 21 approaching the first lens 10 and a second sub lens 22 approaching the third lens 30.

The first sub lens 21 has a positive (+) power. Also, the first sub lens 21 has a surface R3 convex toward the object. The second sub lens 22 has a negative (−) power. Also, the second sub lens 22 has a surface R5 concave toward the light receiving device 60.

The first sub lens 21 and the second sub lens 22 have a contact surface F4. The contact surface R4 may be flat or concave toward the second sub lens 22.

The second lens 20 has a positive (+) power on the whole.

The third lens 30 has a negative (−) power. Also, the third lens 30 has a surface R8 concave toward the light receiving device 60.

The first lens 10, the second lens 20, and the third lens 30 have aspheric surfaces toward the object and the light receiving device 60, respectively. However, the first lens 10, the second lens 20, and the third lens 30 do not have inflection points, respectively.

Also, the fourth lens 40 may be an aspheric doublet lens. The fourth lens 40 includes a first sub lens 41 approaching the object and a second sub lens 42 approaching the light receiving device 60.

The first sub lens 41 has a positive (+) power. Also, the first sub lens 41 has a surface R9 convex toward the object. The second sub lens 42 has a negative (−) power. Also, the second sub lens 42 has a surface R11 concave toward the light receiving device 60.

The first sub lens 41 and the second sub lens 42 have a contact surface R10. The contact surface R10 may be flat or concave toward the second sub lens 42.

The fourth lens 40 has a positive (+) power on the whole.

The first lens 10, the second lens 20, third lens 30, and the fourth lens 40 may be formed of a plastic material. The whole surfaces of the first lens 10, the second lens 20, third lens 30, and the fourth lens 40 may be aspheric surfaces, respectively.

Alternatively, the whole surfaces of the first lens 10, the second lens 20, third lens 30, and the fourth lens 40 may be aspheric surfaces, respectively, and also, an aspheric surface inflection point may be defined at a center of the convex surface R9 of the fourth lens 40 to correct spherical aberration and astigmatism.

The first lens 10 may have a refractive index and power greater than those of the second lens 20, the third lens 30, and the fourth lens 40.

The iris 25 is disposed between the second lens 20 and the third lens 30. Light incident from the second lens 20 may selectively converge through the iris 25 to adjust a focus length.

Since the iris 25 is disposed between the second lens 20 and the third lens 30, the lenses may be symmetrically disposed with respect to the iris 25. Thus, the imaging lens may easily correct aberration.

The filter 50 may be an IR cut filter and also be omitted.

The light emitting device 60 that is a top surface R14 may an available wavelength band of about 400 nm to about 1,000 nm so as to be used for day and night.

Also, the light receiving device 60 on which an image is formed may include an image sensor for converting an optical signal corresponding to a subject image into an electrical signal. The image sensor may include a charge coupled device (CCD) or a complementary metal oxide semiconductor (CMOS) sensor.

Here, to transmit an image of light having a wavelength band of about 400 nm to about 1,000 nm through the imaging lens, the following Relations may be satisfied.

$$1 < d1/d2 < 105 \quad \text{[Relation 1]}$$

Where, d1 is defined as the entire length of a lens, i.e., a distance from the uppermost point of the surface R1 convex toward the object up to the lowermost of the surface R11 concave toward the light receiving device 60, and d2 is defined as a focus length.

$$1.5 < Vd(R3)/Vd(R4) < 2.5,$$

$$0.5 < Vd(R9)/Vd(R10) < 1 \quad \text{[Relation 2]}$$

Where, Vd (lens surface) is defined as an Abbe's number of the corresponding lens surface.

As described above, when the relations 1 and 2 are satisfied, the imaging lens may receive visible light and infrared light to effectively transmit the light, thereby being used for day and night.

Thus, a distance d1 between the first to fourth lenses 10 to 40 may be controlled in relation to the focus length, and Abbe's numbers of both lens surfaces R3, R4, R9, and R10 of the first sub lenses 21 and 41 in the second and third lenses 20 and 30 may be controlled according to Relation 2. Thus, an imaging lens used for day and night without providing a separate imaging lens may be provided.

Also, the first lens 10 may have a refractive index and power greater than those of the second lens 20, the third lens 30, and the fourth lens 40, and the iris 25 may be disposed at a center of the first to fourth lenses 10 to 40 to realize the imaging lens having superior aberration properties.

Figure 2:
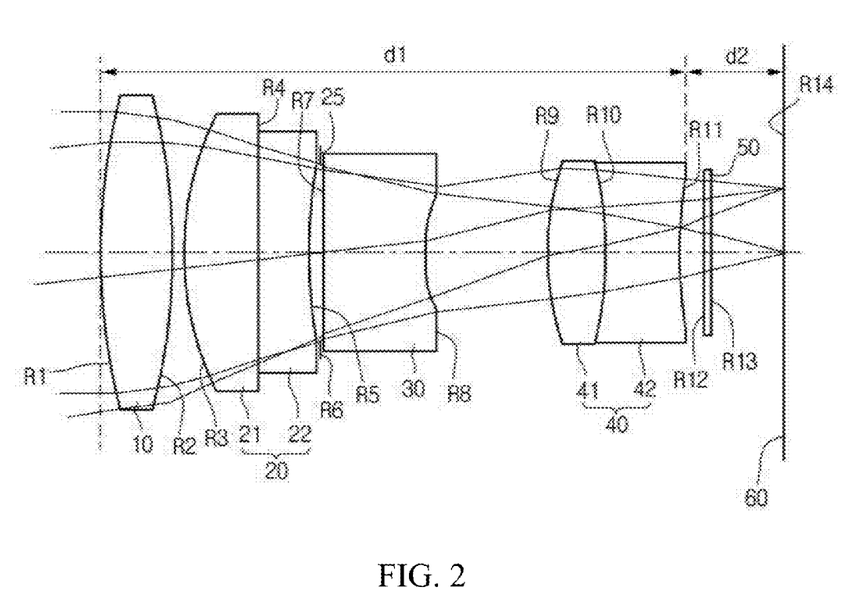
FIG. 2 is a schematic side-sectional view illustrating an inner surface of an imaging lens according to a second embodiment.
Figure 3:
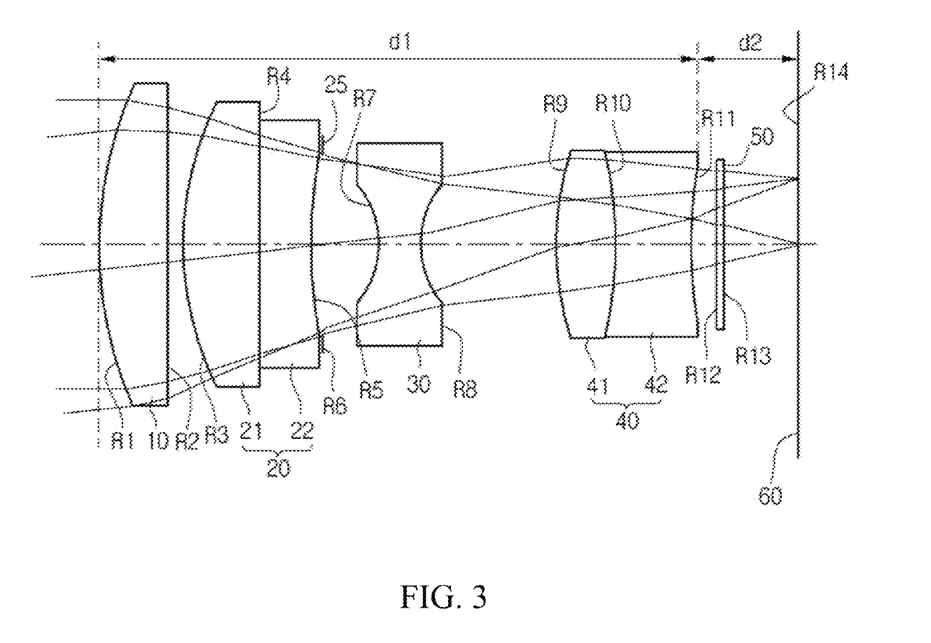
FIG. 3 is a schematic side-sectional view illustrating an inner surface of an imaging lens according to a third embodiment.
Figure 4:
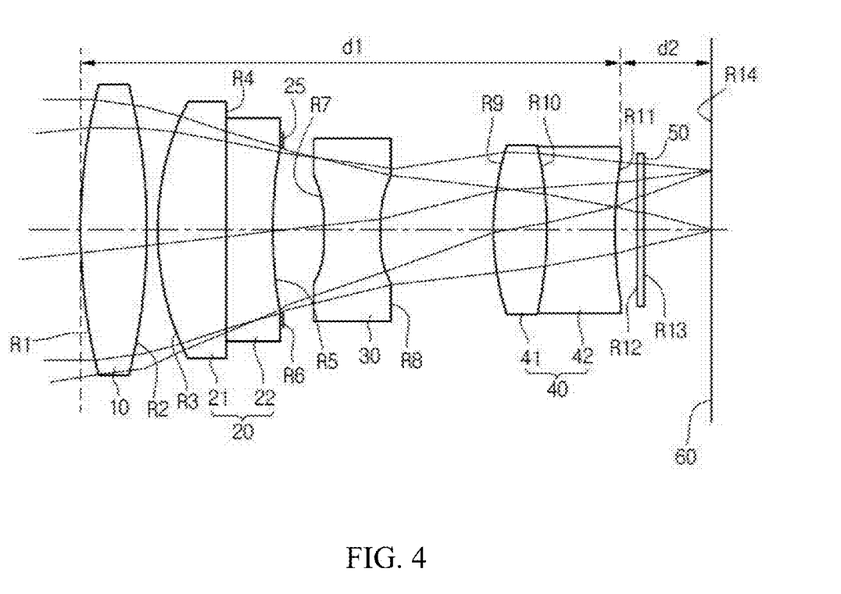
FIG. 4 is a schematic side-sectional view illustrating an inner surface of an imaging lens according to a fourth embodiment.

FIGS. 2 to 4 are schematic side-sectional views of an imaging lens according to another embodiment.

Referring to FIG. 2, an imaging lens according to a second embodiment includes a first lens 10, a second lens 20, an iris 25, a third lens 30, a fourth lens 40, a filter 50, and a light receiving device 60 which are sequentially disposed from an object toward a top surface R14.

To obtain an image of a subject, light corresponding to image information of the subject is incident into the light receiving device 60 through the first lens 10, the second lens 20, the iris 25, the third lens 30, the fourth lens, and the filter 50.

The first lens 10 has a positive (+) power. Also, the first lens 10 has a surface R1 convex toward the object and a surface R2 convex toward the light receiving device 60.

The second lens 20 may be a doublet lens. The second lens 20 includes a first sub lens 21 approaching the first lens 10 and a second sub lens 22 approaching the third lens 30.

The first sub lens 21 has a positive (+) power. Also, the first sub lens 41 has a surface R3 convex toward the object. The second sub lens 22 has a negative (−) power. Also, the second sub lens 42 has a surface R5 concave toward the light receiving device 60.

The first sub lens 21 and the second sub lens 22 have a contact surface F4. The contact surface R4 may be flat or concave toward the second sub lens 22.

The second lens 20 has a positive (+) power on the whole.

The third lens 30 has a negative (−) power. Also, the third lens 30 has a surface R8 concave toward the light receiving device 60.

The first lens 10, the second lens 20, and the third lens 30 have aspheric surfaces toward the object and the light receiving device 60, respectively. However, the first lens 10, the second lens 20, and the third lens 30 do not have inflection points, respectively.

Also, the fourth lens 40 may be an aspheric doublet lens. The fourth lens 40 includes a first sub lens 41 approaching the object and a second sub lens 42 approaching the light receiving device 60.

The first sub lens 41 has a positive (+) power. Also, the first sub lens 41 has a surface R9 convex toward the object. The second sub lens 42 has a negative (−) power. Also, the second sub lens 42 has a surface R11 concave toward the light receiving device 60.

The first sub lens 41 and the second sub lens 42 have a contact surface R10. The contact surface R10 may be flat or concave toward the second sub lens 42.

The fourth lens 40 has a positive (+) power on the whole.

The first lens 10, the second lens 20, third lens 30, and the fourth lens 40 may be formed of a plastic material. The whole surfaces of the first lens 10, the second lens 20, third lens 30, and the fourth lens 40 may be aspheric surfaces, respectively.

Alternatively, the whole surfaces of the first lens 10, the second lens 20, third lens 30, and the fourth lens 40 may be aspheric surfaces, respectively, and also, an aspheric surface inflection point may be defined at a center of the convex surface R9 of the fourth lens 40 to correct spherical aberration and astigmatism.

The first lens 10 may have a refractive index and power greater than those of the second lens 20, the third lens 30, and the fourth lens 40.

The iris 25 is disposed between the second lens 20 and the third lens 30. Light incident from the second lens 20 may selectively converge through the iris 25 to adjust a focus length.

Since the iris 25 is disposed between the second lens 20 and the third lens 30, the lenses may be symmetrically disposed with respect to the iris 25. Thus, the imaging lens may easily correct aberration.

The filter 50 may be an IR cut filter and also be omitted.

The light emitting device 60 that is a top surface R14 may an available wavelength band of about 400 nm to about 1,000 nm so as to be used for day and night.

Also, the light receiving device 60 on which an image is formed may include an image sensor for converting an optical signal corresponding to a subject image into an electrical signal. The image sensor may include a charge coupled device (CCD) or a complementary metal oxide semiconductor (CMOS) sensor.

Here, to transmit an image of light having a wavelength band of about 400 nm to about 1,000 nm through the imaging lens, the above-described Relations 1 and 2 may be satisfied.

Thus, a distance d1 between the first to fourth lenses 10 to 40 may be controlled in relation to the focus length, and Abbe's numbers of both lens surfaces R3, R4, R9, and R10 of the first sub lenses 21 and 41 in the second and third lenses 20 and 30 may be controlled according to Relation 2. Thus, an imaging lens used for day and night without providing a separate imaging lens may be provided.

Also, the first lens 10 may have a refractive index and power greater than those of the second lens 20, the third lens 30, and the fourth lens 40, and the iris 25 may be disposed at a center of the first to fourth lenses 10 to 40 to realize the imaging lens having superior aberration properties.

Referring to FIG. 3, an imaging lens according to a third embodiment includes a first lens 10, a second lens 20, an iris 25, a third lens 30, a fourth lens 40, a filter 50, and a light receiving device 60 which are sequentially disposed from an object toward a top surface R14.

To obtain an image of a subject, light corresponding to image information of the subject is incident into the light receiving device 60 through the first lens 10, the second lens 20, the iris 25, the third lens 30, the fourth lens, and the filter 50.

The first lens 10 has a positive (+) power. Also, the first lens 10 has a surface R1 convex toward the object.

The second lens 20 may be a doublet lens. The second lens 20 includes a first sub lens 21 approaching the first lens 10 and a second sub lens 22 approaching the third lens 30.

The first sub lens 21 has a positive (+) power. Also, the first sub lens 41 has a surface R3 convex toward the object. The second sub lens 22 has a negative (−) power. Also, the second sub lens 42 has a surface R5 concave toward the light receiving device 60.

The first sub lens 21 and the second sub lens 22 have a contact surface F4. The contact surface R4 may be flat or concave toward the second sub lens 22.

The second lens 20 has a positive (+) power on the whole.

The third lens 30 has a negative (−) power. Also, the third lens 30 has a surface R8 concave toward the light receiving device 60 and a surface R7 concave toward the object.

Also, the fourth lens 40 may be an aspheric doublet lens. The fourth lens 40 includes a first sub lens 41 approaching the object and a second sub lens 42 approaching the light receiving device 60.

The first sub lens 41 has a positive (+) power. Also, the first sub lens 41 has a surface R9 convex toward the object. The second sub lens 42 has a negative (−) power. Also, the second sub lens 42 has a surface R11 concave toward the light receiving device 60.

The first sub lens 41 and the second sub lens 42 have a contact surface R10. The contact surface R10 may be flat or concave toward the second sub lens 42.

The fourth lens 40 has a positive (+) power on the whole.

The iris 25 is disposed between the second lens 20 and the third lens 30. Light incident from the second lens 20 may selectively converge through the iris 25 to adjust a focus length.

Since the iris 25 is disposed between the second lens 20 and the third lens 30, the lenses may be symmetrically disposed with respect to the iris 25. Thus, the imaging lens may easily correct aberration.

The light emitting device 60 that is a top surface R14 may an available wavelength band of about 400 nm to about 1,000 nm so as to be used for day and night.

Here, to transmit an image of light having a wavelength band of about 400 nm to about 1,000 nm through the imaging lens, the above-described Relations 1 and 2 may be satisfied.

Thus, a distance d1 between the first to fourth lenses 10 to 40 may be controlled in relation to the focus length, and Abbe's numbers of both lens surfaces R3, R4, R9, and R10 of the first sub lenses 21 and 41 in the second and third lenses 20 and 30 may be controlled according to Relation 2. Thus, an imaging lens used for day and night without providing a separate imaging lens may be provided.

Also, the first lens 10 may have a refractive index and power greater than those of the second lens 20, the third lens 30, and the fourth lens 40, and the iris 25 may be disposed at a center of the first to fourth lenses 10 to 40 to realize the imaging lens having superior aberration properties.

Also, combining the second and third embodiment as shown in FIG. 4, the first lens 10 has a positive (+) power. Also, the first lens 10 has a surface R1 convex toward the object and a surface R2 convex toward the light receiving device 60. The third lens 30 has a negative (−) power. Also, the third lens 30 has a surface R8 concave toward the light receiving device 60 and a surface R7 concave toward the object. The second and fourth lenses 20 and 40 may be equal to those of the first embodiment.

When the imaging lens of FIG. 4 satisfies Relations 1 and 2, the imaging lens capable of being used for day and night may be provided.

Figure 5:
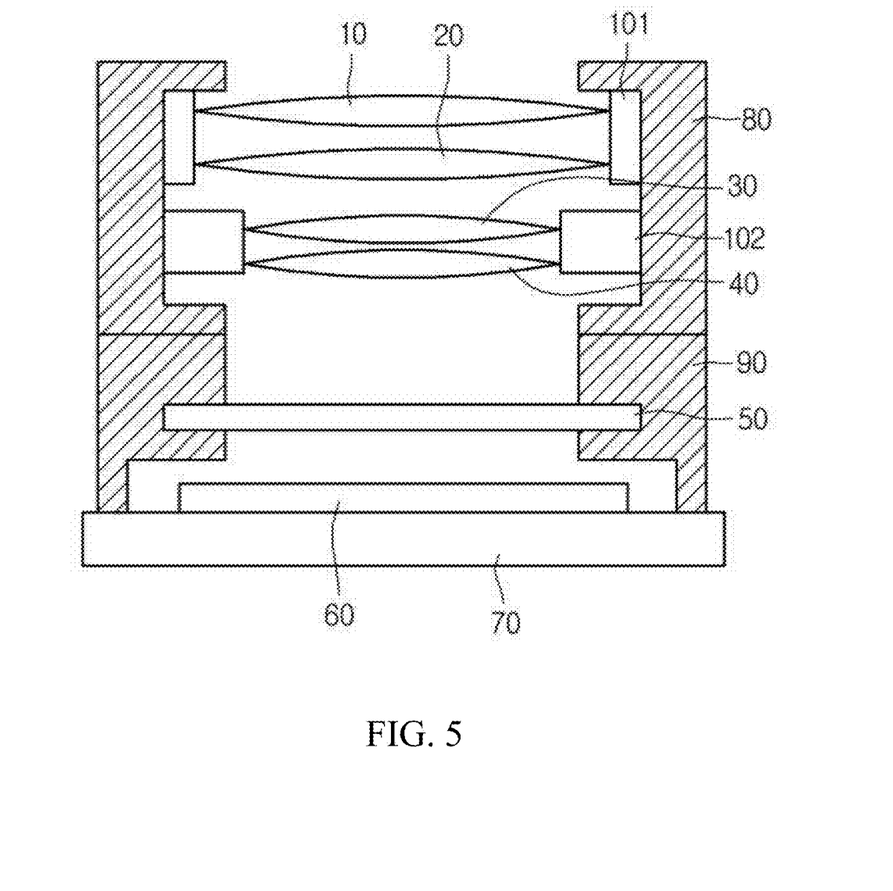
FIG. 5 is a schematic side-sectional view illustrating a camera module including the imaging lens according to the first to fourth embodiments.

FIG. 5 is a schematic side-sectional view illustrating a camera module including the imaging lens according to the first to fourth embodiments.

For reference, the imaging lens of FIG. 5 may have an optional shape.

Referring to FIG. 5, a camera module includes a housing 80 in which first to fourth lenses 10 to 40 are disposed, a holder 90, and a printed circuit board (PCB) 70.

The housing 80 includes the first to fourth lenses 10 to 40.

The first lens 10 and the second lens 20 are mounted on a first lens holder 101, and the third lens 30 and the fourth lens 40 are mounted on a second lens holder 102. The first to fourth lenses 10 to 40 collect light into a light receiving device disposed on the PCB 70.

The first and second lenses 10 and 20 may have internal or external diameters greater than those of the third and fourth lenses 30 and 40.

Differences between the external diameters of the first and second lenses 10 and 20 and the external diameters of the third and fourth lenses 30 and 40 may be compensated by the lens holders 101 and 102, respectively. Thus, the housings 80 of the camera modules according to the first to fourth embodiments may have the same size.

The holder 90 disposed under the housing 80 is disposed under the second lens 20 and includes a filter 50.

The filter 50 may include an IR cut filter. When the filter 50 is omitted, the holder 90 may be omitted also.

The filter 50 may inhibit radiant heat emitted from external light from being transmitted into the light receiving device 60.

Also, the light receiving device 60 on which an image is formed may include an image sensor for converting an optical signal corresponding to a subject image into an electrical signal. The image sensor may include a charge coupled device (CCD) or a complementary metal oxide semiconductor (CMOS) sensor.

In the imaging lens according to the embodiment, the powers, distances, and Abbe's numbers of the first to fourth lenses may be controlled to photograph an image of visible light and infrared light. Also, the iris may be disposed between the second and third lenses to effectively correct the aberration. Thus, the imaging lens may be mounted on a camera module for day and night photography.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An imaging lens comprising:
   a first lens having a positive (+) power;
   a second lens having a positive (+) power;
   a third lens having a negative (−) power; and
   a fourth lens having a positive (+) power;
   wherein the first lens, the second lens, the third lens, and the fourth lens are sequentially disposed away from an object side to transmit an image of light having a wavelength band in a range between about 400 nm and about 1,000 nm and receive visible light and infrared light, such that the imaging lens is used during day and night;
   wherein all of the first to fourth lenses are aspherical lenses;
   wherein the fourth lens has an aspheric surface inflection point on an image side surface thereof;
   wherein both the second lens and the fourth lens are doublet lenses;
   wherein the second lens comprises a first sub lens having a positive (+) power and a second sub lens having a negative (−) power in an order from the object side to the image side of the imaging lens, and the first sub lens and the second sub lens jointly have a first contact surface, and the first contact surface is flat or concave toward the second sub lens;
   wherein the fourth lens comprises a third sub lens having a positive (+) power and a fourth sub lens having a negative (−) power in order from the object side to the image side of the imaging lens, and the third sub lens and the fourth sub lens jointly have a second contact surface and the second contact surface is flat or concave toward the fourth sub lens;
   wherein the third lens is a bi-concave lens;
   wherein the first sub lens has a convex surface on the object side thereof, and the second sub lens has a concave surface on the image side thereof; and
   wherein the third sub lens has a convex surface on the object side thereof, and the fourth sub lens has a concave surface on the image side thereof.

2. The imaging lens according to claim 1, wherein an iris is disposed between the second lens and the third lens, and
   wherein the first to fourth lenses are symmetrically disposed with respect to the iris.

3. The imaging lens according to claim 1, wherein the imaging lens satisfies following relation:

$1 < d1/d2 < 105$ (where d1 is defined as an entire length of the imaging lens, and d2 is defined as a back focal length of the imaging lens.

4. The imaging lens according to claim 3, wherein an object-side surface and a light receiving device-side surface of the second sub lens of the second lens satisfy following relation:

$1.5 < Vd(\text{object-side surface})/Vd(\text{light receiving device-side surface}) < 2.5$ where Vd(object-side surface) is defined as an Abbe's number of the object-side surface of the second sub lens of the second lens, and Vd(light receiving device-side surface) is defined as an Abbe's number of the light receiving device-side surface of the second sub lens of the second lens.

5. The imaging lens according to claim 4, wherein an object-side surface and a light receiving device-side surface of the fourth sub lens of the fourth lens satisfy following relation:

$0.5 < Vd(\text{object-side surface})/Vd(\text{light receiving device-side surface}) < 1$ (where, Vd is defined as an Abbe's number of a corresponding surface)
   where Vd(object-side surface) is defined as an Abbe's number of the object-side surface of the fourth sub lens of the fourth lens, and Vd(light receiving device-side surface) is defined as an Abbe's number of the light receiving device-side surface of the fourth sub lens of the fourth lens.

6. The imaging lens according to claim 1, wherein the first lens has a power greater than powers of the second lens to the fourth lens.

7. The imaging lens according to claim 1, wherein the first lens has a refractive index greater than refractive indexes of the second to fourth lenses.

8. The imaging lens according to claim 1, wherein the first lens has a surface convex toward the object.

9. The imaging lens according to claim 1, wherein the third lens has a surface concave toward an imaging side that is on an opposite side of the imaging lens with respect to the object.

10. The imaging lens according to claim 1, wherein the first lens has a surface convex toward an imaging side that is on an opposite side of the imaging lens with respect to the object.

11. The imaging lens according to claim 1, wherein the first lens has surfaces convex toward an imaging side that is on an opposite side of the imaging lens with respect to the object.

* * * * *